Patented July 20, 1943

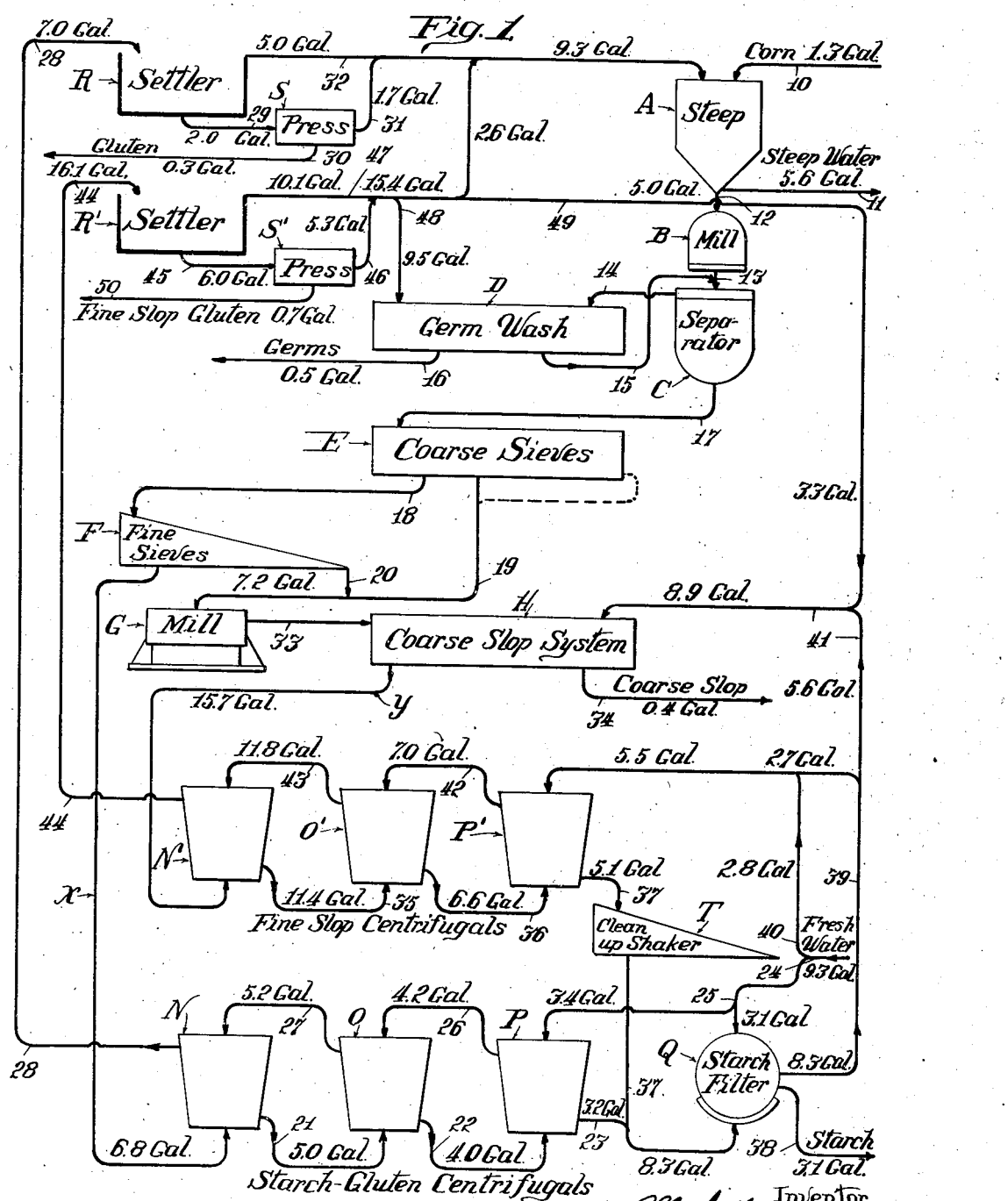

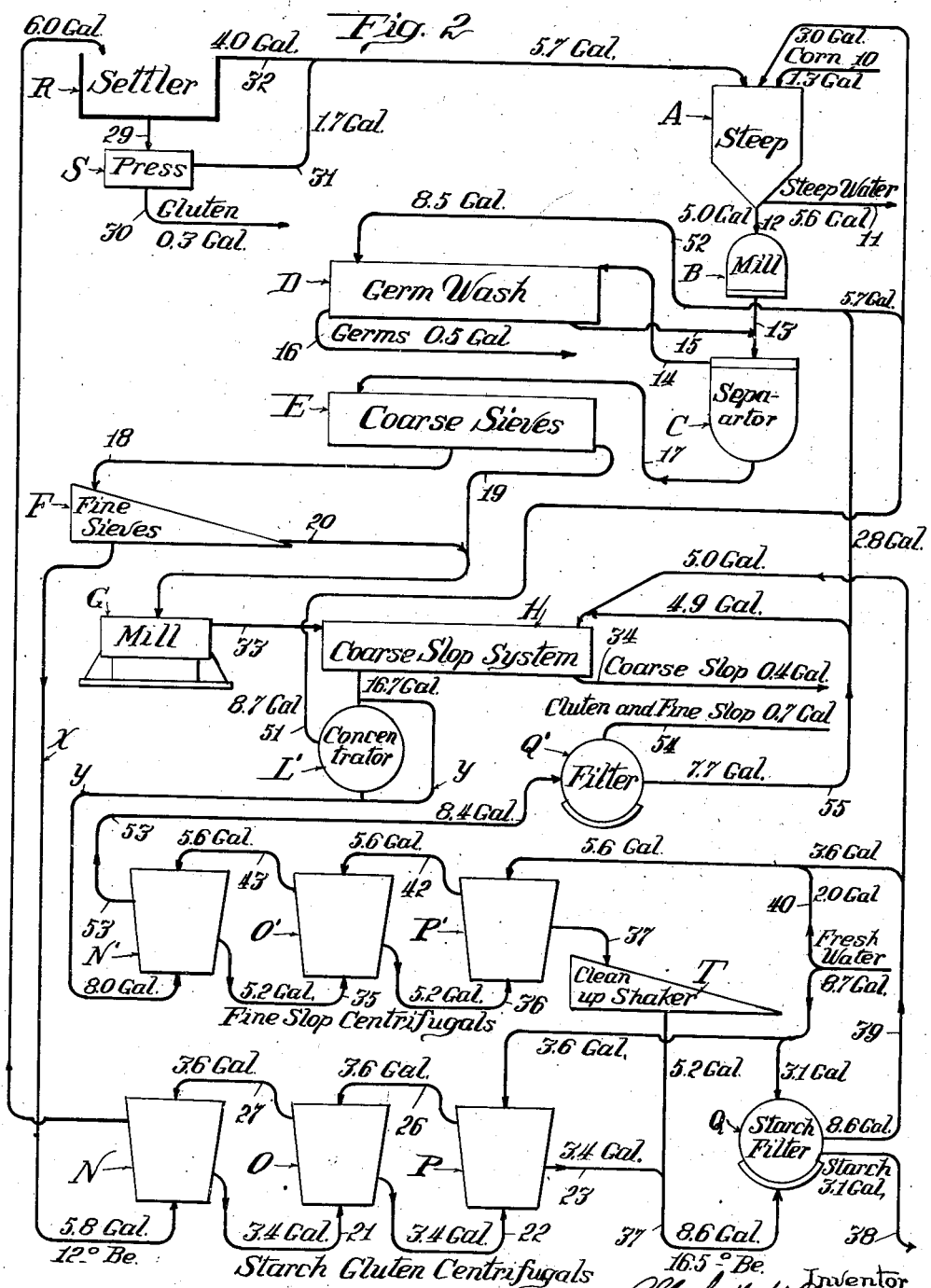

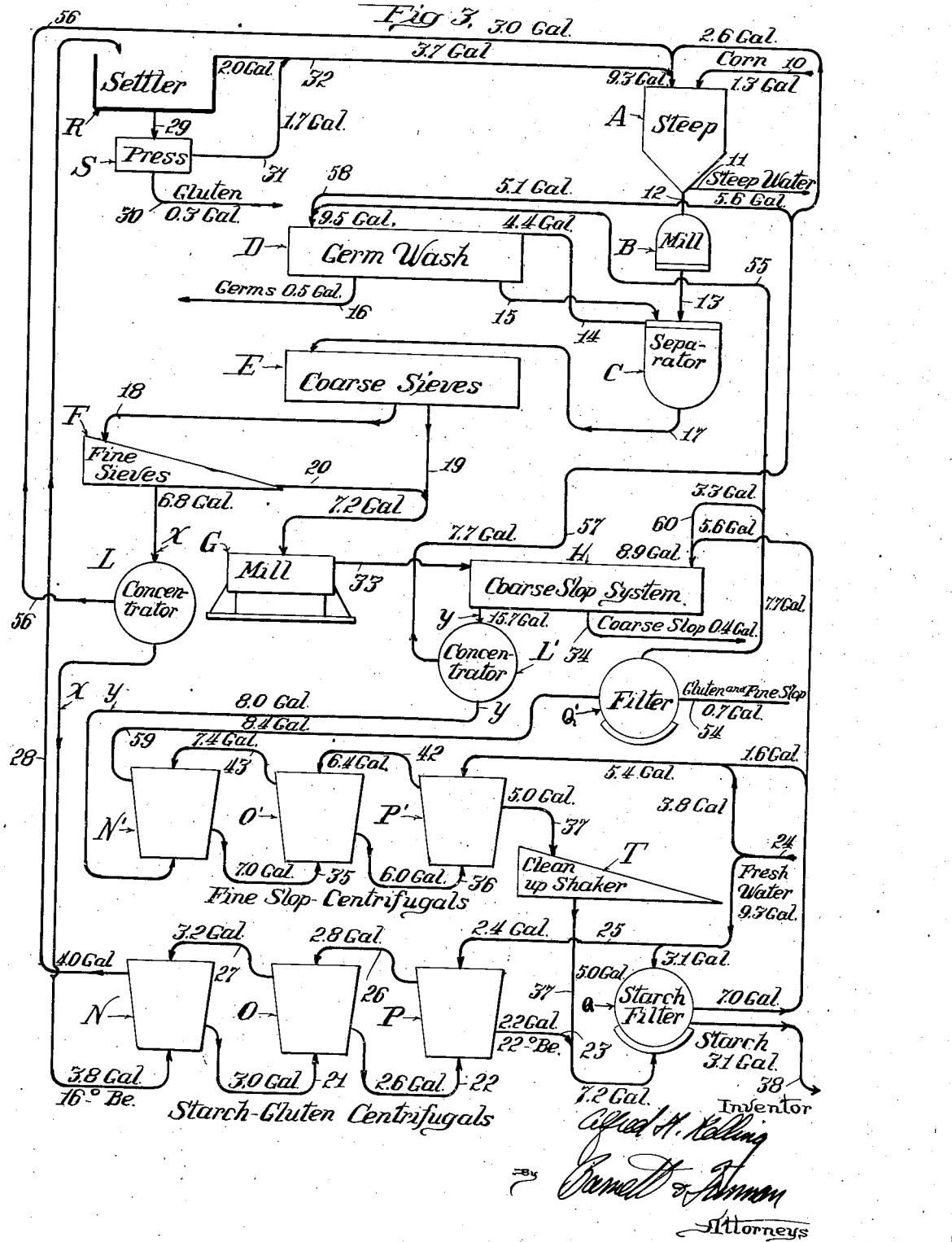

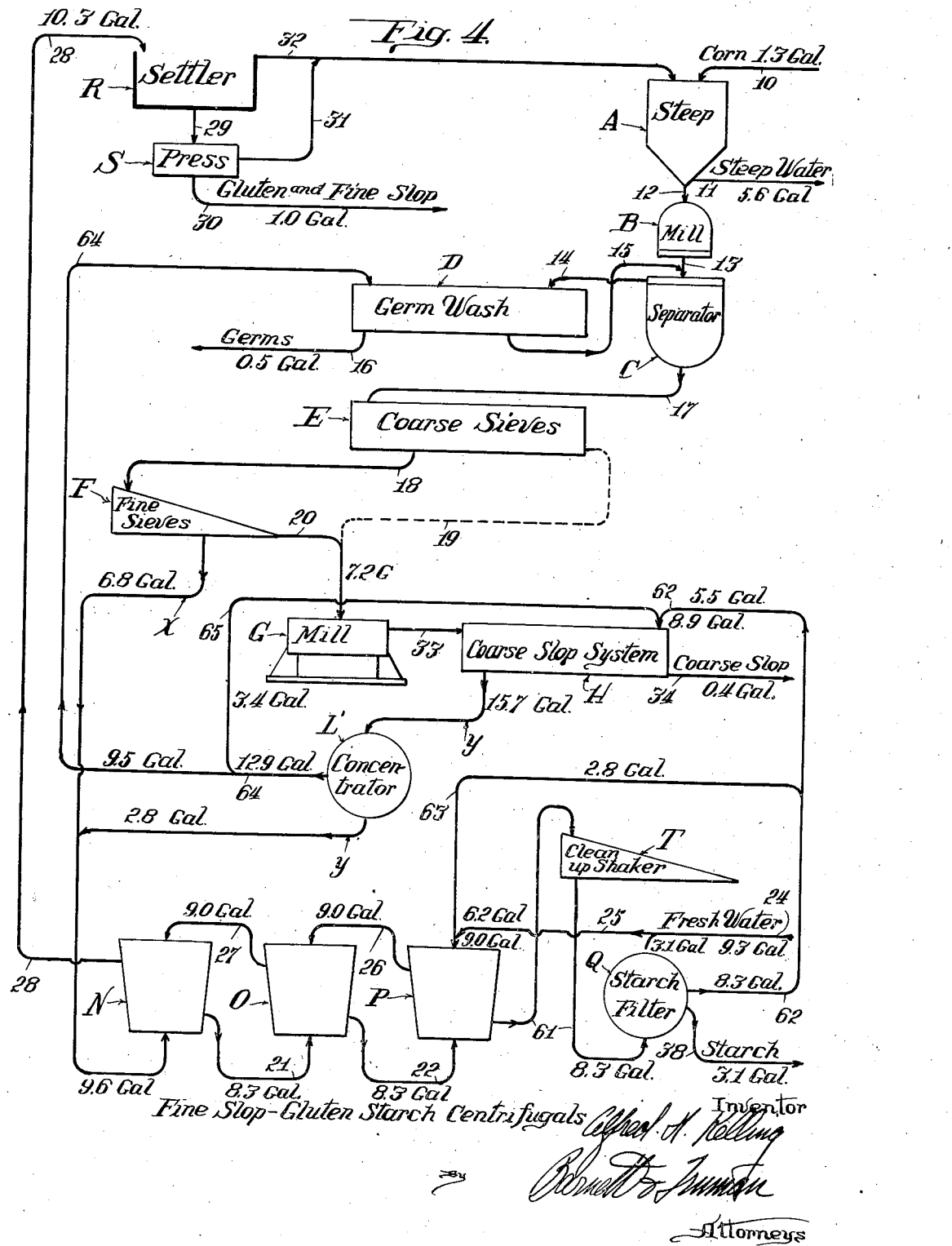

2,324,849

UNITED STATES PATENT OFFICE 2,324,849

MANUFACTURE OF STARCH

Alfred H. Kelling, Chicago, Ill., assignor, by mesne assignments, to Corn Products Refining Company, New York, N. Y., a corporation of New Jersey Application June 5, 1933, Serial No. 674,366

1 Claim. (Cl. 127—68)

This invention relates to the manufacture of starch and by-products from corn by the wet method.

In my copending application Serial No. 675,412, filed June 12, 1933, is disclosed a method of manufacturing starch from corn which substitutes for the usual tabling of the starch milks (mixtures of starch, gluten and water) derived from the germ, coarse slop and fine slop separations, the expedient of centrifuging the starch milks for the removal of the gluten from the starch.

The present invention aims at a further simplification of the starch making process by the elimination, not only of the tables, but also of the usual system of silk reels and/or shakers known collectively as the fine slop system; and the substitution in the process for the separating operations performed by these reels and shakers, of a series of centrifuging operations, by which the fine particles of bran and fibre, as well as the gluten, in the starch liquor are removed from the starch milk and washed to recover the starch, gluten and fine slop more efficiently than by the customary operations of the fine slop system.

The invention has in view the advantage of re-using in the process all process waters, except the water from the steeping system which is withdrawn and sent to evaporators for recovering the solubles, and except the moisture absorbed in the discharged solids, germs, slop, gluten and starch. The invention has in view the further advantage of re-using the process waters having the highest content of solubles or other impurities in the steeps and of re-using in the wet starch system, that is, in the germ, coarse slop and fine slop separations, process waters containing smaller quantities of solubles—impurities including and, generally speaking, being mensurable in terms of solubles. An indeterminate part of any given volume of water returned to the wet starch system in the same step of operation may remain in the system for an indefinite period. This is unavoidable in any closed system having a quantity of water in any one step of the process greater than the amount of fresh water taken into the process. All process waters will contain micro-organisms and the products of the activity of these micro-organisms constitute in part the impurities that are to be found in the starch and when the waters cycle and recycle in any portion of the process these micro-organic impurities multiply many fold. It is believed that the impurities of micro-organic origin because of their colloidal character, are particularly difficult to remove by the ordinary starch filtering methods. In any event, it is obviously desirable to have the wet starch system as sterile as possible; and it is also desirable to minimize the use of the agents, heat and sulphur dioxide, which are ordinarily used for the purpose of keeping down micro-organic activity. The maintenance of a relatively sterile wet starch system is promoted by any manipulation of the corn material in the process, whereby the cycling of water in any portion of the system is minimized and the attendant accumulation of micro-organisms with their impurities is likewise minimized and like the soluble substances supporting micro-organic life are concentrated in certain of the process liquors, so far as that is possible, and these liquors high in micro-organic impurities and solubles used for steeping the corn; and where there remain, for reuse in the wet starch system, process waters of lesser but varying soluble impurity content, the liquids having the higher soluble impurity content should be re-used in the wet starch system as near the head end of the system as possible so that they will remain in the system for the shortest possible time.

The present invention provides a process of manufacturing starch from corn in which these principles are adhered to and put into operation.

Other objects of the invention will be adverted to in the following description of certain illustrative and preferred embodiments of the invention.

In the drawings the numerals followed by the abbreviation "Gal" represent gallons of water per bushel of corn ground. It will be understood that these water balance figures are merely illustrative. The apparatuses used are shown diagrammatically. Centrifugal machines of the type indicated are known and in use in other arts. The term "pipe" as used in the description is intended to include any conduit or conveying means whereby the material is moved from one piece of apparatus to another. The term "bran" is intended to include the hull and fibre constituents of the corn.

Referring first to Fig. 1, A designates one of the tanks of the steeping system which ordinarily consists of a plurality of steep tanks arranged for counter-current operation. B is a mill for breaking up the steeped corn so as to free the germ, and C is the germ separator containing a starch liquor of such gravity that the germs will float off while the rest of the corn sinks to the bottom of the vessel. D represents the germ washing system, E coarse sieves which receive the degerminated corn, and F, fine sieves for screening the liquid from the coarse sieves E. G is a mill for fine grinding the tailings from the coarse and fine sieves. H represents the coarse slop system. N, O and P represent a series of centrifugals for separating the gluten from the starch in the starch milk stream from the fine sieves; and N', O' and P' represent a similar series of centrifugal machines which take the place of the silk reels and shakers commonly used for the fine slop separation and remove from the starch milk issuing from the coarse slop system the fine particles of bran and fibre, as well as the gluten present in coarse slop stream. Q is a starch filter, R a settler for the overflow from centrifugal N, and R' a settler for the overflow from centrifugal N'. The gluten in settler R is pressed in press S and the gluten with fine slop in settler R' is pressed in press S'. T is a clean-up shaker which is used, preferably, for further purifying the starch from the fine slop centrifugals.

The connections between the apparatuses above named will be described in connection with the following description of the operation of the system.

*Operation Fig. 1.*—The corn containing 1.3 gallons of water enters the steeping system A at 10 and 5.6 gallons of steep water is drawn off at 11 and sent to the evaporators (not shown) for concentration and saving of soluble substances. The steeped corn passes through pipe 12, with 5.0 gallons of water to the mill B, and the coarse ground corn from the mill B through pipe 13 to the separator C. The germs pass through pipe 14 from the separator to the germ washing system D, the wash water passing back through pipe 15 to the separator C and the germs carrying 0.5 gallon of water being discharged at 16. The degerminated corn passes from the separator C through pipe 17 to the coarse sieves E and the liquid from the coarse sieves E through pipe 18 to the fine sieves F. The tailings from the coarse sieves E pass through pipe 19 to the mill G and are joined by the tailings from the fine sieves F, as indicated at 20, this material carrying 7.2 gallons of water.

The starch milk (starch, gluten and water) from the fine sieves, that is to say, from the germ system, passes through pipe x, the amount being 6.8 gallons, to the first centrifugals. The underflow from centrifugal N, 5.0 gallons, passes through pipe 21 to centrifugal O and the underflow from centrifugal O, 4.0 gallons, passes through pipe 22 to centrifugal P, the underflow from which, 3.2 gallons, carrying the purified starch, being discharged through pipe 23 leading to the starch filter Q. The centrifugal machines are of the known type in which underflow and overflow liquids are discharged, the former carrying the heavier solid particles (starch) and the latter the lighter particles (gluten). A wash water is introduced into each centrifugal, preferably into the starch zone of the centrifugal, and this operates, by dilution and displacement, to not only facilitate the separation as between starch and gluten but also to ultimately concentrate the solubles in the overflow or gluten stream, as more fully described in my copending application Serial No. 675,412 above referred to. The centrifugal machines are arranged for counter-current operation. The underflow passes from machine to machine in one direction, as described, the overflow passes through the apparatus in the opposite direction. In the arrangement shown, the system is supplied with 9.3 gallons of fresh water through pipe 24. Of this 3.1 gallons goes to the starch filter Q for washing the starch, as will be described, and 3.4 gallons through branch pipe 25 to the starch zone of the third centrifugal P. The overflow from centrifugal P, 4.2 gallons, passes by pipe 26 to the starch zone of centrifugal O, and the overflow from centrifugal O, 5.2 gallons, through pipe 27 to the starch zone of centrifugal N. The overflow from the first centrifugal N, 7.0 gallons, passes through pipe 28 to the settler R. The gluten in the settler goes through pipe 29 to the gluten press S with 2.0 gallons of water, and the gluten containing 0.3 gallons of water is discharged from the system at 30. The press water, 1.7 gallons, passes through pipe 31 to the overflow pipe 32 of the settler which latter carries off 5.0 gallons of overflow water from the settler.

The corn material finely ground in the mill G passes through pipe 33 to the coarse slop system H which may consist of the usual copper reels and shakers for screening out the larger bran particles. This coarse slop is discharged from the system at 34 and contains 0.4 gallon of water. The liquid discharged from the coarse slop system through pipe y, with a water content of 15.7 gallons, instead of being screened and the tailings washed in a system of silk reels and/or shakers (fine slop system) as has been customary heretofore, is, according to the present invention, subjected to a centrifuging operation or preferably to a series of centrifuging operations arranged on the counter-current principle which separates from the starch contained in this liquid, the gluten therein and also the fine slop, that is the fine bran particles that are too small to be intercepted by the copper screens of the coarse slop system. Furthermore, this centrifuging operation is preferably performed in such manner that it eliminates from the starch also a considerable proportion of the corn solubles in the starch milk, thus simplifying and facilitating the subsequent starch washing operation which is ordinarily carried on in displacement filters of the vacuum or pressure type. The invention, therefore, involves more than the mere use of centrifugals in place of silk sieves or silk reels or shakers (although this substitution in itself has the great advantage of economy since the silk reels and shakers are expensive to install and to maintain). The centrifuging operation also performs, so far as this starch milk stream is concerned (the y stream) the operation usually effected through tabling and, in some measure, also the operation of washing the starch in the filter or filters. That is, in the improved system there are only two so called mill starch streams (starch, gluten and water) one from the germ system through the coarse sieves E and fine sieves F—the x stream—and one from the coarse slop system H—the y stream—instead of the three streams according to standard practice today. The stream of mill starch from the coarse slop system H passes through pipe y, the water content being 15.7 gallons, into the first of the fine slop centrifugals N. This stream, it will be understood, contains not only starch and gluten, but also fine bran and fibre particles. The underflow from centrifugal N', 11.4 gallons, passes through pipe 35 to centrifugal O', and the underflow from centrifugal O', 6.6 gallons, passes through pipe 36 to centrifugal P'. The underflow from centrifugal P', 5.1 gallons, passes through pipe 37 to pipe 23 and thence to starch filter Q. Preferably a clean-up shaker is interposed in pipe 37 in order to remove any residual bran particles in the underflow. The total amount of starch going to the starch filter, including that from centrifugals N, O, P is carried by 8.3 gallons. The starch is discharged from the filter through pipe 38 and contains 3.1 gallons of water. The starch filtrate, from the dewatering and washing of the starch, in all 8.3 gallons, passes into pipe 39, 2.7 gallons going to the centrifugal P' as wash water, augmented by 2.8 gallons of fresh water through branch pipe 40, making 5.5 gallons of wash water to this centrifugal, and 5.6 gallons through branch pipe 41 to the coarse slop system H. The overflow from centrifugal P', 7.0 gallons, goes through pipe 42 to the starch zone of centrifugal O', and the overflow from centrifugal O', 11.8 gallons, goes through pipe 43 to the starch zone of centrifugal N'. The overflow from centrifugal N', carrying gluten, bran and the major portions of the solubles in the y stream, passes through pipe 44 to the settler R', the volume being 16.1 gallons. The settlings in R' carrying 6.0 gallons pass through pipe 45 to the press S', and the press water, 5.3 gallons, passes through pipe 46 to the overflow pipe 47 of settler R'. 10.1 gallons of water overflows from the settler, making 15.4 gallons with the press water and this is distributed as follows: 2.6 gallons through pipe 47 to the overflow pipe 32 of settler R, making 9.3 gallons delivered to the steeping system A; 9.5 gallons through pipe 48 to the germ wash D; and 3.3 gallons through pipe 49 which connects with pipe 41, augmenting the liquid delivered to the coarse slop system H to 8.9 gallons. The settlings in settler R', fine slop and gluten, containing 0.7 gallon of water, are discharged from the system at 50.

It will be observed that all the high soluble process water from settler R goes to the steeps, as well as a portion of the process water from settler R', containing the next highest concentration of solubles. The starch wash water from filter Q having the minimum quantity of solubles and impurities is used in the later stages of the process, to wit, in the fine slop centrifugals and in the coarse slop system.

In the system of Fig. 2, the y stream is concentrated so that the overflow from the fine slop centrifugals is thick enough to be filtered, thus eliminating one set of settlers and shortening the period of time that the y stream material remains in the process, the filtering operation requiring much less time than settling.

*Operation Fig. 2.*—The operation is the same as in the system of Fig. 1, and the apparatuses and connections are given corresponding reference characters, except as follows: Arranged in a by-pass of pipe y—the outflow pipe from the coarse slop system H—is a concentrator L' which may be a dewatering filter or other suitable device for eliminating some of the water from the stream of fine slop liquor coming from the coarse slop system. 16.7 gallons of fine slop (or so much of this quantity as may be necessary to give the desired concentration) passes through concentrator L' and is reduced in volume to 8.0 gallons by elimination of 8.7 gallons of water which latter passes through pipe 51, 5.7 gallons going back to the germ wash D, 3.0 gallons going to the steeping system. The concentrated y stream enters centrifugal N' as in the Fig. 1 system. The overflow from centrifugal N', gluten and fine slop with 8.4 gallons of water, passes through pipe 53 to a de-watering filter Q'. The gluten and fine slop is discharged from filter Q' at 54 and contains 0.7 gallons of water. The filtrate from filter Q', 7.7 gallons, passes through pipe 55 to pipe 52 and thence to the germ wash D, making, with the water from concentrator L', 8.5 gallons delivered to germ wash D. The water balance figures of Fig. 2, not mentioned specifically above, can be found on the drawings.

A further modification is shown in Fig. 3, where both x and y streams are concentrated, whereby it is possible to use less centrifugal equipment, or to obtain a better separation with the same equipment; this being an advantage in that the concentrators cost less than the centrifugal machine.

*Operation Fig. 3.*—The operation is the same as in Fig. 1, and the apparatuses and their connections are given corresponding reference characters, with the following exceptions: A concentrator L is arranged in pipe x reducing the 6.8 gallons delivered by fine sieves F to 3.8 gallons going to the centrifugal N, the density being about 16° Baumé. The 3.0 gallons of water eliminated by concentrator L passes through pipe 66 to the steeping system. A concentrator L' is arranged in pipe y leading from the coarse slop system H which reduces the 15.7 gallons of water in the fine slop liquid from the coarse slop system to 8.0 gallons entering the centrifugal N'. The eliminated water, 7.7 gallons, passages into pipe 57, 2.6 gallons going to the steeping system and 5.1 gallons, through pipe 58, to the germ wash D. The overflow from centrifugal N', 8.4 gallons, passes through pipe 59 to the filter Q', from which is discharged at 54 gluten and fine slop containing 0.7 gallon of water. The filtrate from filter Q' passes through pipe 55, the amount being 7.7 gallons 4.4 gallons going to the germ wash D and 3.3 gallons, through pipe 60, to the coarse slop system H.

Another modification is shown in Fig. 4, in accordance with which the x and y streams—the starch and gluten from the germ separation and the starch, gluten and fine slop from the coarse slop system—are combined after concentration of one or both of them, and sent through a single series of centrifugal machines which separate from the starch the fine slop, gluten and also, preferably, as in the other systems described, the major portion of the solubles.

*Operation Fig. 4.*—The system of Fig. 4 is the same as that of Fig. 1, and the apparatuses and connections are given corresponding reference characters, with the following exceptions: One series of centrifugals is omitted. In the pipe y from the coarse slop system H is arranged a concentrator L' which reduces the 15.7 gallons of fine slop liquid coming from the coarse slop system to 2.8 gallons. This is mixed with 6.8 gallons in pipe x from the germ system (via coarse sieves E and fine sieves F) making 9.6 gallons going to the centrifugal N. The underflow from centrifugal P passes into pipe 61 in which is arranged, preferably, a clean-up shaker T, pipe 61 delivering 8.3 gallons of purified starch milk to the starch filter Q. The filtrate from starch filter Q, 8.3 gallons, passes into pipe 62, 5.5 gallons going to the coarse slop system H and 2.8 gallons, through pipe 63 to the starch zone of centrifugal P, augmenting to 9.0 gallons the 6.2 gallons of fresh water introduced into the centrifugal. The water eliminated from the y stream by concentrator L, 12.9 gallons, passes into pipe 64, 9.5 gallons going to the germ wash D and 3.4 gallons through pipe 65 to the coarse slop system H.

Other modifications will be suggested to those skilled in the art. It is the intention to cover all modifications and variations within the scope of the appended claim.

I claim:

In the process of obtaining starch from corn in which the corn is steeped and subjected to germ and coarse slop separations yielding separate starch milk streams: the improvement which comprises subjecting the starch milk from the germ separation to a centrifuging operation to remove the gluten from the starch; subjecting the starch milk from the coarse slop separation to a separate centrifuging operation to remove the gluten and fine slop; dewatering the gluten from said first named centrifuging operation and using the water for steeping corn as the process proceeds; and dewatering the gluten and slop magma from the second named centrifuging operation and using the water in later stages of the process.

ALFRED H. KELLING.

CERTIFICATE OF CORRECTION.

Patent No. 2,324,849.                      July 20, 1943.

ALFRED H. KELLING.

It is hereby certified that error appears in the printed specification of the above numbered patent requiring correction as follows: Page 3, first column, line 36, for "containing 0.7" read --which, after being pressed, contain 0.7--; and that the said Letters Patent should be read with this correction therein that the same may conform to the record of the case in the Patent Office.

Signed and sealed this 31st day of August, A. D. 1943.

(Seal)                                          Henry Van Arsdale,
                                          Acting Commissioner of Patents.